UNITED STATES PATENT OFFICE.

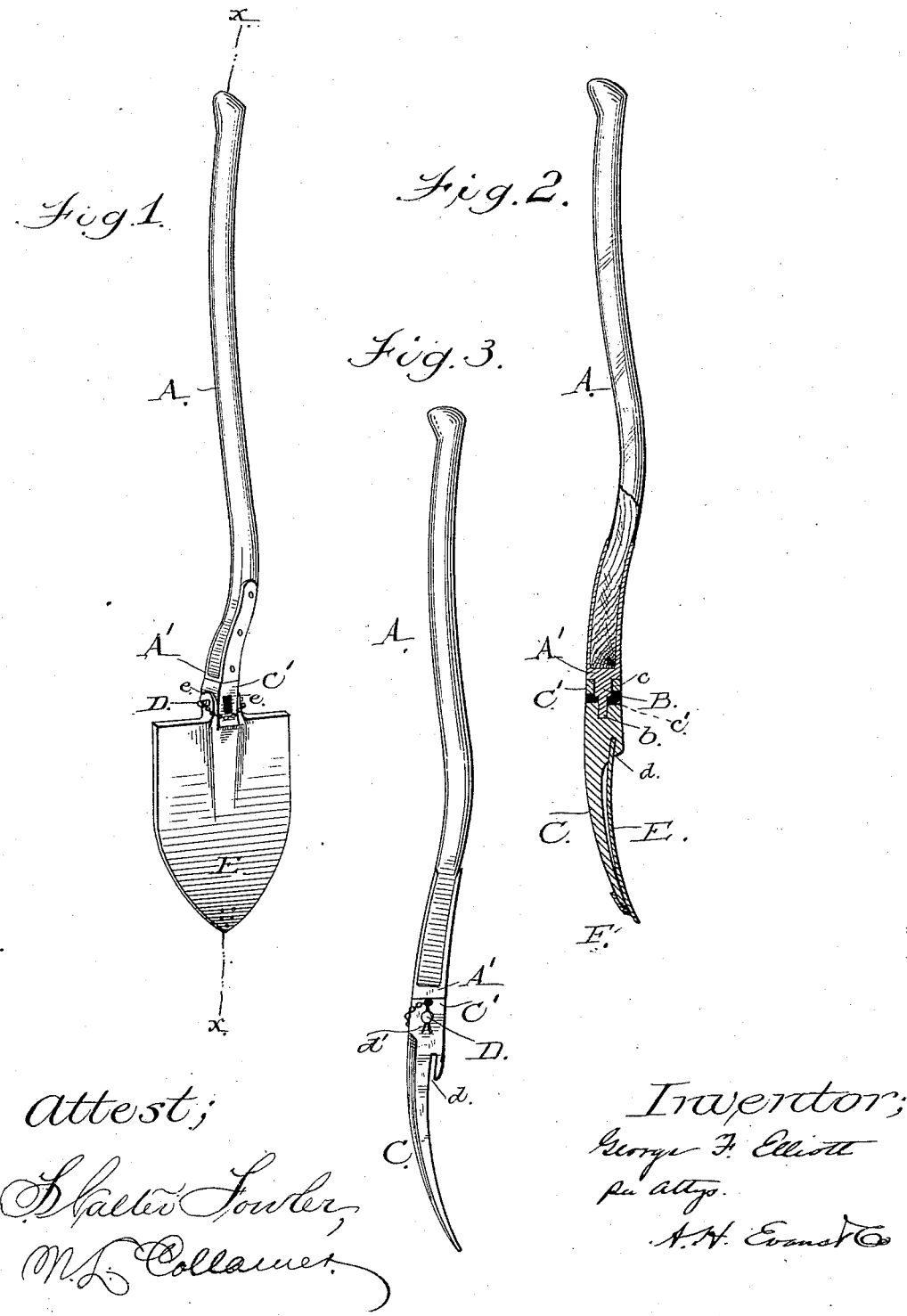

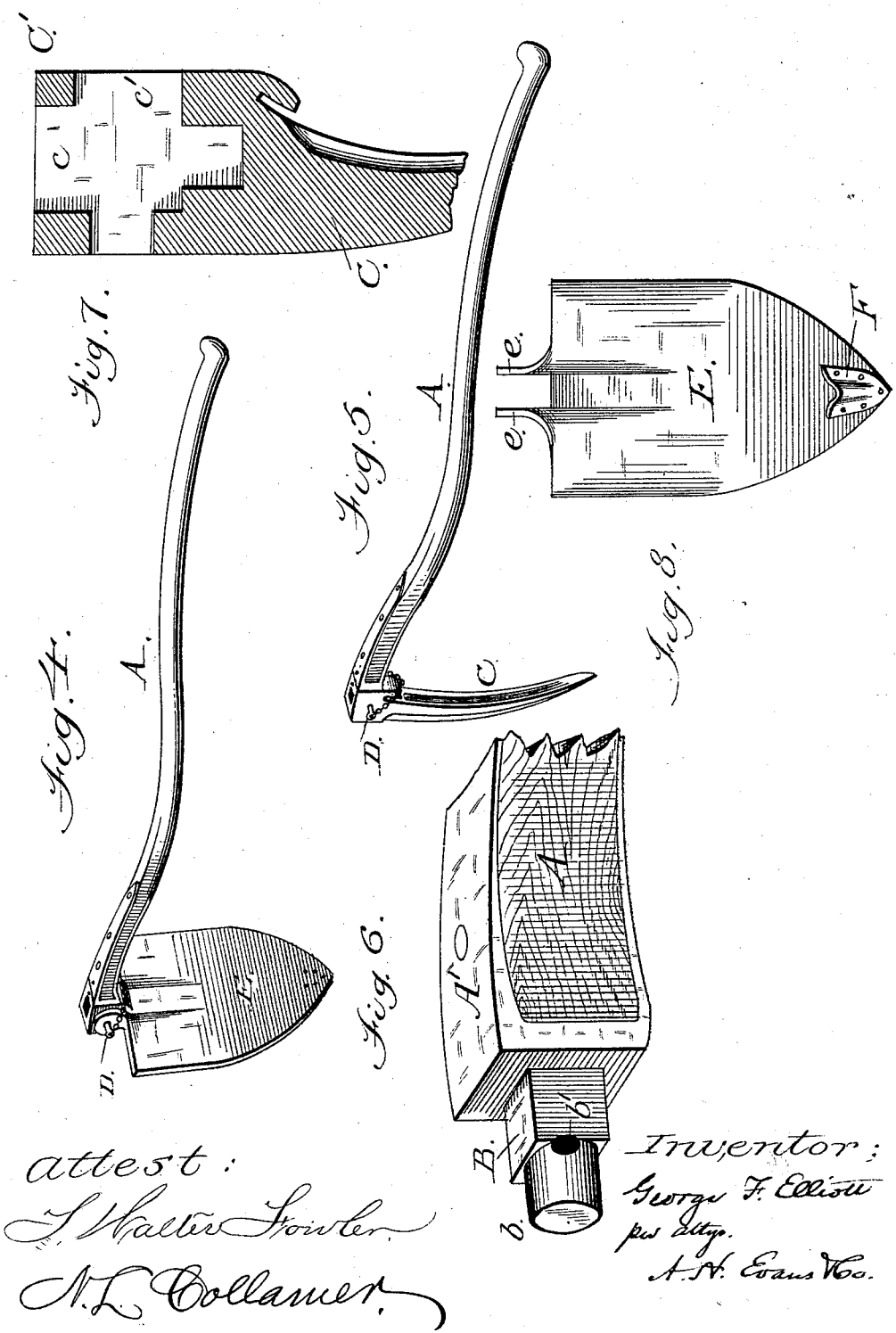

GEORGE F. ELLIOTT, OF CHARLESTOWN, MASSACHUSETTS.

INTRENCHING-TOOL.

SPECIFICATION forming part of Letters Patent No. 285,594, dated September 25, 1883.

Application filed May 22, 1883. (No model.)

*To all whom it may concern:*

Be it known that I, G. F. ELLIOTT, of Charlestown, in the county of Suffolk, State of Massachusetts, have invented a new and useful Improvement in Intrenching-Tools, of which the following is a clear, full, and exact description, reference being had to the accompanying drawings, making a part of this specification, in which—

Figure 1 represents the tool when used as a shovel. Fig. 2 is a longitudinal section of the same. Fig. 3 shows the shovel removed and the tool as a crow-bar. Fig. 4 shows the tool when used as a hoe. Fig. 5 shows the hoe removed and the tool as a pick. Fig. 6 shows the end of the handle, with the device for attaching the tools. Fig. 7 shows a different view of the pick detached. Fig. 8 is a detached view of the shovel.

My invention relates to intrenching-tools which form part of the equipment of a soldier, and which may also be used by prospectors, miners, and others.

To enable others to make and use my invention, I will proceed to describe the exact manner in which I have carried it out.

In the drawings, A represents the handle of my improved intrenching-tool, provided with a metallic head, A', on which are secured the devices hereinafter described. This head has a rectangular portion, B, with a rounded extension, $b$, and hole $b'$, for the reception of the key-bolt for locking the devices in position.

The pick C is formed with a rectangular head, C', in which are provided the necessary sockets $c$, $c'$, to receive the rectangular and round projections on the head A', and on the inner side of the pick is formed the slot $d$, for the reception of the upper edge of the shovel, as shown in Fig. 2.

When the tool C is to be used as a crowbar, the handle is to be passed into the socket $c$; but when used as a pick, the handle is introduced into the socket $c'$. When in position, the tool is locked by the bolt D, which passes through the tool and the head, as shown in Fig. 3.

The shovel-blade E should be made of rolled steel, slightly curved or hollowed, as other shovel-blades are made. At its upper end it is drawn into two lugs or ears, $e\,e$, which extend up on each side of the head C' of the pick, and by which the shovel is secured by means of the lock-bolt D, as shown in Fig. 1. Near the lower end of the shovel-blade, and on its under side, I secure a strap or socket, F, called the "toe-piece," which secures the end of the pick when in place, as shown in Fig. 2.

To mount my intrenching-tool as a spade or shovel for work, take the blade in the left hand and the pick in the right, run the point of the pick down the back of the blade until it takes in the shoe-piece, then shove the upper part of pick between the lugs of the blade, and press down home, being sure that the upper edge of blade between the lugs goes underneath the jaw or cut made to receive it in upper part of pick-front. Now, with the right hand, insert the handle in hole at top of pick in such manner that the dot (punch-mark) on back of handle corresponds with dot on back of pick. Insert the lock-bolt. This bolt may be in turn secured by a small split pin, $d'$, and inserted in the hole in end of back-bolt D.

When the tool is to be used as a pick, take off the blade and insert the handle in the hole in the front of the pick-head in such manner that the dot on back of metallic part of handle corresponds with the two dots on top the pick, near the front edge. Put in the solid pin and bring the split pin around underneath the handle. When it is desired to be used as a hoe, put the blade on the pick part as for "spade," and insert the handle as for "pick." When a crow-bar is wanted, take the blade off the pick, and insert the handle as for a spade.

This combined intrenching-tool is readily transported by the soldier by means of a bag, with the strap resting on the right shoulder.

Having thus described my invention, what I claim as new, and desire to secure by Letters Patent, is—

In an intrenching-tool, the handle A, having the metallic head A', provided with rectangular portion B and round extension $b$, in combination with the pick C, having the rectangular head C', provided with the sockets $c$ $c'$, and the shovel-blade E, having the lugs or ears $e\,e$ and socket F, all constructed to operate substantially as and for the purpose set forth.

GEORGE F. ELLIOTT.

Witnesses:
CHARLES R. BYRAM,
JOHN W. HUDSON.